July 30, 1929.  H. W. ABEL  1,722,879
ANIMAL TRAP
Filed Nov. 5, 1928
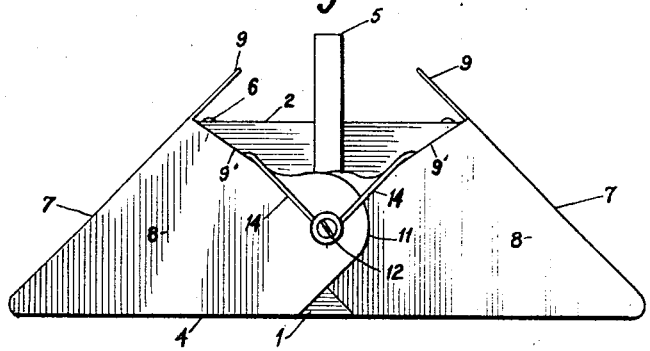
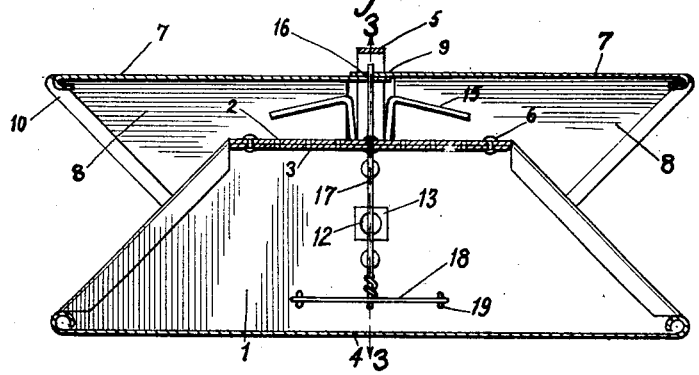
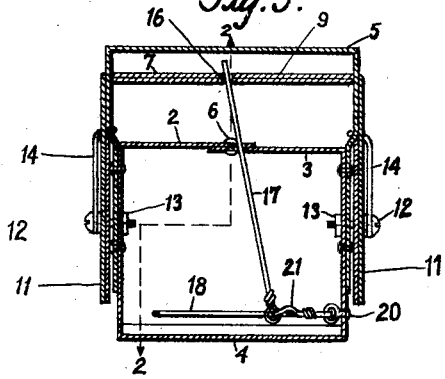
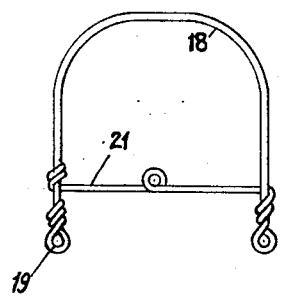
Henry W. Abel INVENTOR
BY *Victor J. Evans* ATTORNEY
WITNESS:

Patented July 30, 1929.

1,722,879

UNITED STATES PATENT OFFICE.

HENRY W. ABEL, OF BRILLION, WISCONSIN.

ANIMAL TRAP.

Application filed November 5, 1928. Serial No. 317,274.

The object of this, my present invention, is the provision of a trap for trapping fur bearing animals or birds without inflicting injury to the catch.

A further object is the provision of a trap for this purpose that is of an extremely simple construction, may be readily set without danger to the operator, which is positive in action and which will not inflict injury to the bird or animal caught therein.

To the attainment of the foregoing the invention resides in the improvement hereinafter described and definitely claimed.

In the drawings:

Figure 1 is a side elevation of the trap in accordance with this invention in sprung or closed position.

Figure 2 is an approximately central longitudinal sectional view therethrough, the trap being in set position.

Figure 3 is a transverse sectional view approximately on the line 3—3 of Figure 1.

Figure 4 is a plan view of the bait pan.

My improved trap is wholly constructed of metal and includes a body portion 1 whose top 2 is apertured, as at 3, and is of a less length than its bottom 4. Thus the ends of the body 1 are arranged at opposite inclinations and these ends are preferably reinforced by rounding the same upon themselves.

The body 1 is centrally provided with an upstanding substantially U-shaped bail or handle 5 whereby the trap may be readily conveyed to the place where it is to be set, and also the top of the body comprises lapping members formed by bending the upper and reduced edges of the sides of the body, the said lapping portions being riveted or otherwise effectively connected by means 6.

The doors for the trap which, of course, are designed to close the open ends of the body 1 are each of a substantially similar construction. The outer face of each of the doors is indicated by the numeral 7. These outer face plates are formed with right-angular sides 8. The face plates 7 have what may be termed their upper or inner ends projecting beyond the sides and as disclosed by Figure 2 of the drawings these extensions, indicated by the numeral 9, are arranged in lapping relation. The portions 9 of the doors are formed by cutting away the upper edges of the sides 8 and arranging the same at downward angles, as indicated by the numeral 9'.

The edges of the sides are preferably reinforced by being rolled upon themselves, as at 10, and the lower edges of the said sides, of course, are designed to contact with and to be arranged in a plane with the base 4 of the body 1, when the doors 7 are closed.

The sides 8 are also provided with lapping portions 11 through which there are passed pivot elements 12 that also pass through the sides at the center of the body 1. The pivots 12 are preferably in the nature of bolts which are engaged by nuts 13. The pivots have arranged therearound the coiled central portions of springs whose arms 14 are oppositely directed and the ends of these arms are bent angularly, as at 15, for contacting with the upper edges 9 and the inner faces of the sides 8 of the doors 7.

The lapping or extending portions 9 of the doors 7 are provided with one or a series of transversely arranged openings 16, which, of course, are designed to aline when the doors are open and through these aligning openings there is designed to be passed the end of a rod 17 which is loosely connected to a bait pan 18 that is received in the body 1. As disclosed by Figure 4 of the drawings the bait pan has its body portion formed from a single strand of wire whose outer corners are rounded upon themselves and whose ends are formed with eyes 19 for the reception of comparatively small eyes or bail members 20. A transverse strand 21 connects the parallel strands or arms of the bait pan 18, the said strand 21 being centrally coiled upon itself to provide an eye that is engaged by an eye on the inner end of the trigger rod 17.

In operation the doors are, of course, in open position as disclosed by Figure 2 of the drawings, the bait pan being swung to horizontal position so that the end of the trigger rod 17 will pass through the end of an aperture 16. A suitable bait is arranged upon the pan 18. The weight of a bird or animal upon the bait pan or the depression of the bait pan by an attempt of the removal of the bait thereon will cause the pan to be moved downwardly and thereby bring the trigger rod out of the openings 16 which permits the spring arms 14 to swing the doors 7 to closed position. The doors being provided with the sides 8 which are now in lapping relation at the sides of the body 1, and together with the spring arms 14 hold the doors in closed position, so that the bird or animal cannot escape from the trap while at the same time no injury will be inflicted to such bird or animal as long as it remains in the trap.

The trap is designed to be constructed in various sizes but of thin metal so that the same can be easily conveyed to a place where the same is to be set or to a place where the trapped animal is to be removed therefrom. It is only necessary for the device to be arranged over a suitable container and a pressure exerted upon one of the extensions 9 of the door 7 to open the said door so that the bird or animal will be slid into the cage or other container thereof.

The construction and advantages of my improvement will, it is thought, be understood and appreciated by those skilled in the art without further detailed description, but obviously I do not wish to be restricted to the specific structure herein set forth and, therefore, hold myself entitled to make such changes therefrom as fairly fall within the scope of what I claim.

Having described the invention, I claim:

1. A live animal or bird trap comprising a body having angled ends which are open, a bait pan hinged to one side of the body and having a rod loosely connected thereto and guided through the top of the body, doors having sides which are hingedly connected to the sides of the body, spring means for influencing the doors to close the ends of the body, said doors having their inner ends provided with lapping extensions which are apertured to receive the end of the rod therethrough when the trap is set.

2. A live animal or bird trap comprising a body having angled ends which are open, a bait pan hinged to one side of the body and having a rod loosely connected thereto and guided through the top of the body, doors having sides which are hingedly connected to the sides of the body, spring means for influencing the doors to close the ends of the body, said doors having their inner ends provided with lapping extensions which are apertured to receive the end of the rod therethrough when the trap is set and a handle for the body.

In testimony whereof I affix my signature.

HENRY W. ABEL.